United States Patent [19]

McAda

[11] 3,808,047

[45] Apr. 30, 1974

[54] POLYOLEFIN BLEND COATED ELECTRICAL CABLES

[75] Inventor: Richard B. McAda, Lake Jackson, Tex.

[73] Assignee: The Dow Chemical Company, Midland, Mich.

[22] Filed: Feb. 14, 1972

[21] Appl. No.: 226,274

Related U.S. Application Data

[63] Continuation of Ser. No. 759,763, Sept. 13, 1968, Pat. No. 3,663,663.

[52] U.S. Cl. ......... 117/232, 117/124 E, 117/132 C, 117/138.8 A, 117/148, 117/161 UZ, 117/161 UC

[51] Int. Cl. ........................... B44d 1/42, C09d 3/76

[58] Field of Search....... 117/232, 161 VT, 161 UC, 117/161 UZ, 6, 124 E, 132 C, 138.8 A, 148

[56] References Cited

UNITED STATES PATENTS

| | | | |
|---|---|---|---|
| 3,259,688 | 7/1966 | Towne et al. | 117/232 UX |
| 3,201,498 | 8/1965 | Bronsen et al. | 260/897 |
| 3,248,359 | 4/1966 | Maloney | 260/41 |
| 2,953,541 | 9/1960 | Pecha et al. | 260/45.5 |
| 3,183,283 | 5/1965 | Reding | 260/897 |
| 3,413,167 | 11/1968 | Trill | 117/232 X |

OTHER PUBLICATIONS

Billmeyer, Textbook of Polymer Science, pps. 366–267 (1962).

Primary Examiner—William D. Martin
Assistant Examiner—Harry J. Gwinnell
Attorney, Agent, or Firm—Michael S. Jenkins

[57] ABSTRACT

A new polyethylene blend having improved stress cracking properties, said blend comprising a high molecular weight polyethylene and a copolymer of ethylene and an ester comonomer, such as ethyl acrylate, isobutyl acrylate and vinyl acetate, the copolymer having a molecular weight below 15,000 and the ester comonomer moiety in the range from about 20 to about 65 weight percent. A method for preparing said blend wherein the copolymer is introduced into the polyethylene in the molten state as it passes from the polymerization zone. Electrical cables jacketed with said polyethylene blends are also described.

10 Claims, No Drawings

POLYOLEFIN BLEND COATED ELECTRICAL CABLES

CROSS REFERENCES TO RELATED APPLICATIONS

This is a continuation of Ser. No. 759,763 filed on Sept. 13, 1968, now U.S. Pat. No. 3,663,663.

BACKGROUND OF THE INVENTION

This invention relates to high molecular weight polyethylene blends having improved stress crack resistance and extrudability, and more particularly, to polyethylene blends containing small amounts of certain low molecular weight copolymers of ethylene and ethylenically unsaturated carboxylic esters.

While high molecular weight polyethylene is known to have substantially improved characteristics such as tensile strength, abrasion resistance, temperature resistance and stress crack resistance over lower molecular weight polyethylenes, it unfortunately has a very high viscosity at high temperatures, thus making it very difficult to extrude. One of the most significant disadvantages resulting from the high molecular weight polyethylene's poor extrudability is the increased internal strain present in fabricated articles of the polymer. These increased internal strains in themselves are often sufficent to cause the polymeric material to crack and rupture without being subjected to environmental stress. Generally, however, cracking and rupturing most often occurs when the fabricated polymer is subjected to external stress.

In order to overcome this problem, various kinds and amounts of polymeric materials having better extrusion characteristics have been added to the high molecular weight polyethylenes. For example, U.S. Pat. No. 3,183,283 teaches the addition of low molecular weight highly branched polyethylene to high molecular weight sparsely branched polyethylene; U.S. Pat. Nos. 2,953,541 and 3,201,498 show the addition of high molecular weight copolymers of ethylene and ethyl acrylate; and U.S. Pat. No. 3,182,101 shows the addition of high molecular weight copolymers of ethylene and vinyl acetate. While stress crack resistance and extrudability of high molecular weight polyethylene are improved by anyone of these methods, even further improvement is required by many industries. For example, the protective polymeric coatings needed in the electrical cable industry must possess high stress crack resistance and good extrudability in addition to the tensile strength, high temperature resistance, and abrasion resistance of high molecular weight polyethylene in order to withstand the normal stresses which occur when an electrical cable jacketed with the polymeric material is pulled through a conduit. In addition to this problem, detergents which tend to promote stress cracking must often be used to facilitate pulling the cable through the conduit. In light of these and analogous problems which are present in other industries, it would be highly desirable to have a polymeric material possessing the strength and durability of high molecular weight polyethylene and the extrudability of a low molecular weight polymer of copolymer.

SUMMARY OF THE INVENTION

It is therefore the object of this invention to provide a polymeric material having these desirable characteristics. Another object is to provide a polymeric material which, when fabricated, exhibits improved stress crack resistance. Other objects and advantages of this invention will become apparent in the following summary and detailed description.

The objects of this invention have been attained in polymeric blends comprising (1) high molecular weight polyethylene having melt index in the range from about 0.01 to about 10.0 decigrams/minute as determined by ASTM D–1238–65T (Condition E) and (2) a low molecular weight copolymer hereinafter described in detail. The copolymer component is a copolymer of ethylene and an ethylenically unsaturated carboxylic ester monomer selected from the group of vinyl esters of saturated carboxylic acids and alkyl esters of $\alpha,\beta$-ethylenically unsaturated carboxylic acids. The copolymer has a peak molecular weight as determined by gel permeation chromatography in the range from about 1,000 to about 15,000 and the ester comonomer moiety is present in amounts from about 20 to about 65 weight percent based on the copolymer. The polymeric blend of this invention is preferably prepared by admixing the low molecular weight copolymer with molten, high molecular weight polyethylene.

The practice of this invention provides a material, hereinafter called the polyethylene blend, which is readily extruded to form extruded articles having improved stress crack resistance. The new polyethylene blends adhere well to substantially all metal, glass, wood and plastic surfaces. The polyethylene blends are especially useful for coating articles which must be exposed to extreme weather conditions, to stress crack promoting agents, and/or to abrasive forces. Examples of utility include coating for wire cables, for glass containers, and the like. Such blends are also employed in the fabrication of shaped articles such as bottles and the like.

DESCRIPTION OF THE PREFERRED EMBODIMENTS

Polyethylene having melt index ranging from about 0.01 to about 10.0 decigrams/minute as determined by ASTM D–1238–65T(E) is the major component of the polymeric blend. Examples of suitable polyethylenes include highly branched polyethylenes prepared under high pressures and in the presence of a free radical catalyst and high density, high molecular weight polyethylenes prepared under relatively low pressures and in the presence of a catalyst such as the Ziegler- or Phillips-type.

The low molecular weight copolymer used as a minor component in the blend is a copolymer of ethylene and an ethylenically unsaturated carboxylic ester monomer selected from the group of vinyl esters of saturated carboxylic acids and alkyl esters of $\alpha,\beta$-ethylenically unsaturated carboxylic acids. Examples of suitable ester monomers include methyl acrylate, ethyl acrylate, butyl acrylate, isobutyl acrylate, methyl methacrylate, ethyl maleate, methyl fumarate, vinyl acetate, vinyl propionate and the like. Preferably the copolymer contains one of the following ester monomers: isobutyl acrylate, ethyl acrylate and vinyl acetate. An especially preferred copolymer is ethylene/isobutyl acrylate copolymer as it imparts better tensile strength, electrical properties and elongation to the polymeric blend than do copolymers of ethylene and the other ester monomers. Other suitable copolymers are those of ethylene and ester comonomers selected from the group consisting of vinyl esters of saturated carboxylic acids having from 2 to 8 carbon atoms in the acid moiety and alkyl esters of $\alpha,\beta$-ethylenically unsaturated carboxylic acids having from 3 to 8 carbon atoms in the acid moiety and from 2 to 8 carbon atoms in the alkyl moiety.

Copolymers suitable for use in the polyethylene blends of this invention are characterized by their greasy, highly amorphous qualities. Suitable copolymers have peak molecular weights, as determined by gel permeation chromatography, in the range from about 1,000 to about 15,000 with preferred copolymers having a peak molecular weight between 1,000 and about 10,000. In preferred copolymers the highest molecular weight fraction is below 15,000. Gel permeation chromatographic methods for determining molecular weights of polymers are described by J. C. Moore in the J. Polymer Sci. A., 2, 835(1964). See also L. H. Tung, J. Appl. Polymer Sci., 10, 345(1966) and W. N. Smith, J. Appl. Polymer Sci., 11, 639(1967). Since such copolymers have melt flow viscosities above those which can be accurately measured by ASTM D-1238-65T at 190°C and 2.16 kilograms, it is necessary to alter some of the conditions of this test method in order to obtain more meaningful values. Using the apparatus and procedures of ASTM D-1238-65T except that the diameter of the plastometer orifice is reduced to 0.020 inch and the test temperature is 80°C, the copolymers utilized in this invention exhibit melt flow viscosities in the range from about 0.01 decigram/minute to about 50 decigrams/minute. Based on crude interpolation from these values and the changes in conditions, the copolymers would probably exhibit melt flow viscosities over 2,000 decigrams/minute under conditions of ASTM D-1238-65T(E). The copolymers of this invention have an ester comonomer moiety in the range from about 20 to about 65 weight percent of the copolymer with the preferred ester moiety being in the range from about 30 to about 50 weight percent.

The low molecular weight copolymers are readily prepared by polymerizing the corresponding monomers at high temperatures and pressures in the presence of a free radical catalyst. A suitable means of preparation is described in U.S. Pat. No. 2,395,381 except that higher temperatures and increased catalyst concentration are used. In a preferred method up to about 20 weight percent based on the total comonomer weight of a telomer such as propylene is added to the polymerization zone to inhibit the formation of high molecular weight copolymers.

The blends of this invention comprise from about 85 to about 95 weight percent of the high molecular weight polyethylene and from about 5 to about 15 weight percent of the low molecular weight copolymer with the preferred blends containing from about 92.5 to about 95 weight percent of the polyethylene and from about 5 to about 7.5 weight percent of the copolymer. Preferred concentrations of these two components vary somewhat with the average molecular weight of the copolymer, the concentration of ester monomer in the copolymer, the particular ester monomer, and the melt index of the polyethylene component. For example, as the molecular weight of the copolymer is decreased, the environmental stress crack resistance of the resulting blend is increased. As the ester comonomer concentration in the copolymer is increased, the environmental stress crack resistance of the blend is similarly increased. As the melt index of the polyethylene component becomes lower, extrusion of the blend becomes more difficult, and internal strains of articles fabricated therefrom are increased. As a general rule the better blends are those having total ester comonomer moieties ranging from about 1 to about 10 weight percent with the best blends having ester comonomer moieties ranging from about 1 to about 5 weight percent.

Although the final blend is essentially composed of high molecular weight polyethylene and the low molecular weight copolymer, small amounts of other ingredients such as carbon black, inorganic fillers, antioxidants and the like are optionally included. Such ingredients should not be present in amounts greater than about 10 weight percent based on the blend; otherwise the stress crack resistance and tensile strength of the blend may be reduced considerably. In one embodiment of this invention the blend contains up to about 9 weight percent of carbon black and up to about 2 weight percent of antioxidant, both percentages being based on the blend.

The blends of this invention are readily prepared by mixing the dry components in conventional mixing apparatus such as Banbury mixers, steam heated two roll mill mixers, screw type extruders and the like. Such blends are also suitably prepared by admixing slurries or solutions of the components and then removing the liquid vehicles.

If the components are admixed in the dry state, it is desirable to introduce the low molecular weight copolymer into the polyethylene component while the polyethylene component is in the molten state. In addition, due to the processing problems often caused by the high viscosity of the polyethylene component, is it preferable to introduce the copolymer into the polyethylene as soon as possible in order to lower the viscosity of the polyethylene. In a preferred embodiment, the copolymer is introduced to the polyethylene in the molten state as the polyethylene passes from the polymerization zone to a fabrication apparatus such as an extruder. Although it is desirable to add the copolymer as soon as possible in order to reduce viscosity of the polyethylene and to assure adequate mixing of the components, care must be taken that the copolymer is not added at a point in the polymerization zone where it will interfere with polymerization of ethylene. For example when the polyethylene component is prepared by a high pressure process wherein ethylene is polymerized in a high pressure reactor and the resulting polyethylene in the molten state is removed therefrom to a separation apparatus where unreacted ethylene and other undesirable materials are separated from the polyethylene, the low molecular weight copolymer is preferably injected at a point between the reactor and the separation apparatus. The copolymer may be injected at a point within the reactor if it is near the exit of the reactor. By introducing the copolymer at the earliest possible stage, it is much easier to obtain a more uniform final blend of the polymeric components.

The final blends of this invention have melt flow viscosities low enough to enable them to be worked easily and have substantially improved stress crack resistance, especially in the presence of stress crack promoting detergents.

In the subsequent examples, the following test methods were employed for the measurements referred to herein.

| | |
|---|---|
| Melt Index (M.I.) (Melt Flow Rate, decigrams per minute) | ASTM D-1238-65T (Condition E) |
| Vicat Softening pt. °C. | ASTM D-1525-58T |
| Yield, Tensile, % Elongation | ASTM D-638-64T |
| Density (gms/cc) | ASTM D-792-64T |
| Hardness (Shore "D") | ASTM D-2240-64T |
| Dielectric Constant and Dissipation Factor* | ASTM D-1531 |

*This procedure was modified by using a one-centistoke silicone oil at 10 KH$_z$.

The Standard Environmental Stess Crack Resistance (Std. E.S.C.R.) was measured according to ASTM D-1693-60T with the exception of being tested in 10 percent Igepal and 100 percent Hostapal as well as the 100 percent Igepal prescribed by the ASTM method.

The Brabender Torque Values are used as an indication of the rheology of molten thermoplastics. These values are determined by using a Brabender Plasti-Corder obtained from C. W. Brabender Instruments Co. of South Hackensack, N.J. For these measurements the machine was equipped with standard oil-heated measuring head, No. 5 roller blade style mixer blades and a torque recording chart. The mixing head was heated to 180°C or 140°C ± 0.5°C and operated at 63 rpm. Fifty grams of polymer was charged into the mixing head and the torque recorder and stop watch were started. The torque (in meter-grams) was noted at one-minute intervals starting at 2 minutes and the recordings continued to 11 minutes. "Initial torque" is the reading at 2 minutes and "final torque" is the reading at 11 minutes.

"Brabendered E.S.C.R." refers to a measurement of the environmental stress crack resistance (E.S.C.R.) after the polymer has been "worked" on the Brabender mixer. For these determinations the mixer head is operated at 154°C ± 0.5°C and 125 rpm and the sample is "mixed" or "worked" for one hour. The sample is then removed from mixer head and molded in a platen die at 170°C to prepare specimens according to ASTM D-1693-60T. The molding is done by holding the sample under 5 tons pressure (6 inches ram) for three minutes, then under 25 tons pressure for 2 minutes. The molded sample is then taken from the press and immediately placed in water of a temperature of 15°–20°C and left in the water for 10 minutes. The sample is then conditioned in a 70°C oven for 18 hours, then removed from the oven and conditioned for 72 hours at room temperature (~23°C). From this sample, specimens are cut and tested in detergent according to the procedure prescribed by ASTM D-1693-60T with the exception that as well as the 100 percent Igepal prescribed, 10 percent Igepal and 100 percent Hostapal are also used.

The following examples are given to illustrate more clearly the principle and practice of this invention and are not for the purpose of limitation. Throughout this specification and claims, all parts and percentages are by weight unless otherwise indicated.

EXAMPLE 1

On a two-roll mill mixer heated with 150 psi steam, 7.5 parts of an ethylene/isobutyl acrylate (i-BA) copolymer having a peak molecular weight of about 2500 and an isobutyl acrylate moiety of about 50 percent was admixed with 92.5 parts of polyethylene having melt index of 0.16 decigram/minute and density of 0.9177 until a homogeneous blend was made. The resulting blend was tested and the results are recorded in Table I along with data for the unblended polyethylene control for comparison purposes.

EXAMPLE 2

The process of Example 1 was repeated except that 95 parts of the same polyethylene and 5 parts of an ethylene/vinyl acetate (V.A.) copolymer were blended. The copolymer had a peak molecular weight in the range of about 6,000–8,000 and a vinyl acetate content of about 35 percent. The resulting blend was tested and the results are recorded in Table I along with the data for Example 1 and the data for the unblended polyethylene control for comparison purposes.

TABLE I

| | Polyethylene Control (a) | Blend of Example 1 | Blend of Example 2 |
|---|---|---|---|
| Melt Index | 0.16 | 0.35 | 0.23 |
| Density | 0.9177 | 0.9186 | 0.9192 |
| Yield Strength (psi) | 1423 | 1250 | 1330 |
| Tensile Strength (psi) | 2245 | 1890 | 2020 |
| Elongation (%) | 625 | 585 | 600 |
| Vicat Softening Pt. (°C.) | 92 | 84 | 86 |
| % Reactive Comonomer in Blend | none | 3.8 (i-BA) | 1.8 (V.A.) |
| Brabender Torque at 180°C. | 2350/1590 | 2150/1420 | 2220/1480 |
| E.S.C.R. (b) (Brabendered) | | | |
| 10% Igepal | 9/10/1 hr. | 1/10/168 hrs. | 0/10/168 hrs. |
| 100% Hostapal | 10/10/1 hr. | 5/10/32 hrs. | 0/10/168 hrs. |
| E.S.C.R. (b) (Standard ASTM Meth.) | | | |
| 10% Igepal | 0/10/168 hrs. | 0/10/168 hrs. | 0/10/168 hrs. |
| 100% Igepal | 0/10/168 hrs. | 0/10/168 hrs. | 0/10/168 hrs. |
| 100% Hostapal | 0/10/168 hrs. | 0/10/168 hrs. | 0/10/168 hrs. |

(a) Not an example of this invention.
(b) The values are reported as number of failures/number of samples tested/number of hours of test duration. For example: 9/10/1 hr. means 9 samples failed out of 10 samples tested for 1 hr.; the value 5/10/32 hrs. shows it took 32 hours for half the samples to fail.

The Brabendered E.S.C.R. represent actual conditions more than the Standard E.S.C.R. because a polymer is "worked" or subjected to manipulation at molten temperature during its processing into finished articles.

EXAMPLE 3

The procedure of Example 1 was again repeated except that 7.5 parts of the ethylene/isobutyl acrylate (iBA) copolymer described in Example 1 was blended with 92.5 parts of polyethylene having a melt index of 2.48 decigrams/minute and a density of 0.9173. The properties of the blend are compared with the properties of the unblended polyethylene control employed in the blend of this example in Table II.

EXAMPLE 4

The procedure essentially of Example 1 was employed to blend 5 parts of the ethylene/vinyl acetate (V.A.) copolymer described in Example 2 with 95 parts of the polyethylene described in Example 3. The properties of the blend are shown in Table II.

EXAMPLE 5

Prior to blending with a low molecular weight copolymer, a sample of polyethylene having a melt index of 0.1 decigram/minute and density of 0.918 was admixed with carbon black and 4,4'-thio-bis-(6-tert-butyl-m-cresol) by homogeneously blending 90 parts of the molten polyethylene with 10 parts of a molten carbon black concentrate. The concentrate was composed of 26 parts of carbon black, 0.5 parts of 4,4'-thio-bis-(6-tert-butyl-m-cresol), and 73.5 parts of a polyethylene having a melt index of 0.5 g/10 min. and a density of 0.918. The properties of this control blend are shown in Table III for comparison purposes. 93.9 parts of the control blend described immediately above was homogeneously blended by the procedure described in Example 1 with 6.1 parts of an ethylene/isobutyl acrylate (iBA) copolymer having a peak molecular weight of about 2500 and an isobutyl acrylate moiety of about 50 percent.

The properties of the blend are shown in Table III.

EXAMPLE 6

95 parts of the control blend described in Example 5 above was homogeneously blended by the procedure described in Example 1 with 5 parts of an ethylene/vinyl acetate (VA) copolymer having a peak molecular weight of about 6,000–8,000 and a vinyl acetate moiety of about 35 percent.

The properties of the blend are shown in Table III.

EXAMPLE 7

In order to prepare a base blend for this and following example, ten parts of the carbon black concentrate described in Example 5 was homogeneously blended with 90 parts of a polyethylene having been previously prepared in a tubular reactor and having a density of 0.9162 and a melt index of 0.18 decigram/minute. The properties of this base control blend are shown in Table IV for comparison purposes.

The procedure of Example 6 was employed to homogeneously blend 92.5 parts of the base control blend with 7.5 parts of the ethylene/isobutyl acrylate (iBA) copolymer described in Example 1. The properties of this blend are shown in Table IV.

EXAMPLE 8

The procedure of Example 6 was again employed to homogeneously blend 92.5 parts of the base control blend described in Example 7 with 7.5 parts of the ethylene/vinyl acetate (VA) copolymer described in Example 2. The properties of this blend are shown in Table IV.

TABLE II

|  | Polyethylene Control (a) | Blend of Example 3 | Blend of Example 4 |
| --- | --- | --- | --- |
| Melt Index | 2.48 | 4.35 | 2.71 |
| Density | 0.9173 | 0.9178 | 0.9184 |
| Yield Strength (psi) | 1305 | 1195 | 1255 |
| Tensile Strength (psi) | 1640 | 1505 | 1570 |
| % Elongation | 590 | 600 | 610 |
| Vicat Softening Pt. (°C.) | 88 | 82 | 87 |
| % Reactive Comonomer in Blend | none | 3.8 (iBA) | 1.8 (V.A.) |
| Brabender Torque at 140°C. | 1830/1440 | 1760/1260 | 1780/1320 |
| E.S.C.R. (b) (Standard ASTM) 10% Igepal | 10/10/<1 hr. | 5/10/4 hrs. | 6/10/3 hrs. |
| 100% Igepal | 10/10/<1 hr. | 5/10/5 hrs. | 7/10/1 hr. |

(a) Not an example of this invention
(b) See (b) in Table I

TABLE III

|  | Polyethylene Blend (Control (a)) | Blend of Example 5 | Blend of Example 6 |
| --- | --- | --- | --- |
| Melt Index | 0.11 | 0.21 | 0.14 |
| Density | 0.9314 | 0.9296 | 0.9321 |
| % Carbon Black in blend | 2.8 | 2.41 | 2.7 |
| Yield Strength (psi) | 1430 | 1238 | 1310 |
| Tensile Strength (psi) | 2050 | 1921 | 1870 |

TABLE III—Continued

| | | | |
|---|---|---|---|
| % Elongation | 570 | 645 | 580 |
| Vicat Softening Pt. (°C.) | 91 | 86 | 89 |
| % Comonomer moiety in blend | none | 2.6 (iBA) | 1.8 (VA) |
| Brabender Torque at 180°C. | 2050/1550 | 2080/1510 | 2090/1540 |
| Low Temp. Brittleness at −76°C. | 1/30 | 3/30 | 2/30 |
| Dissipation Factor at 100 $KH_z$ | 0.004 | 0.0012 | 0.0015 |
| Dielectric Constant at 100 $KH_z$ | 2.48 | 2.57 | 2.59 |
| Brabendered E.S.C.R. (b) | | | |
| 10% Igepal | 6/10/6 hrs. | 0/10/168 hrs. | 0/10/168 hrs. |
| 100% Hostapal | 4/ 6/4 hrs. | 0/ 6/168 hrs. | 0/ 6/168 hrs. |

(a) Not an example of this invention.
(b) See (b) in Table I.

TABLE IV

| | Polyethylene Base Blend (Control) (a) | Blend of Example 7 | Blend of Example 8 |
|---|---|---|---|
| Melt Index | 0.25 | 0.25 | 0.23 |
| Density | 0.9295 | 0.9297 | 0.9308 |
| % Carbon Black in Blend | 2.62 | 2.51 | 2.50 |
| % Comonomer moiety in blend | None | 2.8 (iBA) | 2.4 (VA) |
| Yield Strength (psi) | 1405 | 1225 | 1225 |
| Tensile Strength (psi) | 2270 | 2023 | 1935 |
| % Elongation | 697 | 682 | 630 |
| Low Temp. Brittleness at −76°C. | 2/30 | 4/30 | 6/30 |
| Vicat Softening Pt. (°C) | 88 | 85 | 89 |
| Dissipation Factor at 10 $KH_z$ | 0.0001 | 0.0003 | 0.0008 |
| Dielectric Constant at 10 $KH_z$ | 2.58 | 2.61 | 2.61 |
| Brabender Torque at 180°C. | 2060/1620 | 1850/1360 | 1820/1420 |
| Brabender E.S.C.R. (b) | | | |
| 10% Igepal | 10/10/1.5 hrs. | 1/9/168 hrs. | 0/10/168 hrs. |
| 100% Hostapal | 4/ 4/0.5 hrs. | 0/4/168 hrs. | 0/ 3/168 hrs. |

(a) Not an example of this invention.
(b) See (b) in Table I.

EXAMPLE 9

In a reactor train comprising in continuous sequence a high pressure stirred autoclave reactor, a high pressure separator, and a low pressure separator, ethylene was polymerized under conditions required to yield a polyethylene having a melt index of less than 0.1 decigram/min. and a density of about 0.918. The polyethylene, after it was formed in the stirred autoclave section, was extruded into the high pressure separator. Then at a point between the high pressure separator and the low pressure separator, a molten copolymer of ethylene and isobutyl acrylate having an average molecular weight of about 3,000 and an isobutyl acrylate moiety of about 45 percent was added to the molten polyethylene at a rate so that the copolymer comprised 7 to 8 percent of the total blend. Subsequently a molten polyethylene/carbon black concentrate composed of 26 percent of carbon black, 1 percent of 4,4′-thio-bis-(6-tert-butyl-m-cresol), and 73 percent of polyethylene having a density of 0.918 and a melt index of 0.5 decigram/minute was also blended with the polyethylene at a rate so that the concentrate comprised 10 percent of the total blend. The resulting blend had the following properties:

| | |
|---|---|
| Melt Index | 0.18 |
| Density | 0.9328 |
| Yield Strength (psi) | 1210 |
| Tensile Strength (psi) | 1960 |
| % Elongation | 535 |
| % Carbon Black | 2.68 |
| Dissipation Factor at 100 $KH_z$ | 0.0006 |
| Dielectric Constant at 100 $KH_z$ | 2.65 |
| Brabender Torque at 180°C | 2210/1610 |
| Brabender E.S.C.R. (a) | |
| 10% Igepal | 0/10/168 hrs. |
| 100% Igepal | 0/10/168 hrs. |
| 100% Hostapal | 0/10/168 hrs. |

(a) See (b) in Table I.

EXAMPLE 10

In a manner similar to Example 1 above, 5 parts of a low molecular weight copolymer of ethylene with ethyl acrylate was blended with 95 parts of a high molecular wt. polyethylene.

The copolymer contained about 47 percent by weight of ethyl acrylate and had a peak molecular weight of about 5,800. The high molecular weight polyethylene contained about 2.75 percent black and about 500 parts per million 4,4′-thio-bis-(6-tert-butyl-m-cresol) homogeneously dispersed therein. The comparative data for the polyethylene and the blend follows:

|  | Polyethylene (Control) (a) | Blend With Copolymer |
|---|---|---|
| Melt Index | 0.18 | 0.20 |
| Density | 0.9294 | 0.9305 |
| Yield Strength (psi) | 1405 | 1315 |
| Tensile Strength (psi) | 2235 | 2050 |
| Elongation (7) | 645 | 663 |
| Vicat Softening Pt. (°C) | 88 | 89 |
| Brabender Torque at 180°C | 1920/1610 | 1890/1520 |
| E.S.C.R. (Brabendered) (b) |  |  |
| 10% Igepal | 6/10/2 | 0/10/336 |
| 100% Hostapal | 10/10/1 | 0/10/336 |

(a) Not an example of this invention.
(b) See (b) in Table I.

What is claimed is:

1. An electrical cable jacketed with a polymeric material comprising a polyethylene blend having improved stress crack resistance comprising (1) from about 85 to about 95 weight percent of a high molecular weight polyethylene having melt index in the range from about 0.01 to about 10.0 decigrams/minute as determined by ASTEM D–1238–65T(E) and (2) from about 5 to about 15 weight percent of a copolymer of ethylene and at least one ester comonomer selected from the group consisting of alkyl esters of $\alpha,\beta$-ethylenically unsaturated carboxylic acids having alkyl moieties of 1 to 8 carbon atoms and vinyl esters of saturated carboxylic acids having from 2 to 8 carbon atoms, said copolymer having peak molecular weight within the range from about 1000 to about 15,000, the ester comonomer moiety being present in proportion from about 20 to about 65 weight percent based on the copolymer.

2. An electrical cable according to claim 1 wherein the ester comonomer is isobutyl acrylate.

3. An electrical cable according to claim 1 wherein the ester comonomer is ethyl acrylate.

4. An electrical cable according to claim 1 wherein the ester comonomer is vinyl acetate.

5. An electrical cable according to claim 1 wherein the copolymer has a peak molecular weight in the range from about 1,000 to about 10,000.

6. An electrical cable according to claim 1 wherein the copolymer has from about 30 to about 50 weight percent of the ester comonomer.

7. An electrical cable according to claim 1 wherein the polyethylene blend contains up to about 9 weight percent of carbon black and up to about 2 weight percent of antioxidant, said percentages being based on the blend.

8. An electrical cable according to claim 1 wherein the high molecular weight polyethylene has melt index in the range from about 0.01 to about 2.0 decigrams/minute as determined by ASTM D–1238–65T(E).

9. A wire cable coated with a polyethylene blend comprising (1) from about 85 to about 95 weight percent of a high molecular weight polyethylene having melt index in the range from about 0.01 to about 10.0 decigrams/minute as determined by ASTM D–12-38–65T(E) and (2) from about 5 to about 15 weight percent of a copolymer of ethylene and at least one ester comonomer selected from the group consisting of alkyl esters of $\alpha,\beta$-ethylenically unsaturated carboxylic acids having alkyl moieties of 1 to 8 carbon atoms and vinyl esters of saturated carboxlic acids having from 2 to 8 carbon atoms, said copolymer having peak molecular weight within the range from about 1,000 to about 15,000, the ester comonomer moiety being present in proportion from about 20 to about 65 weight percent based on the copolymer.

10. A wire cable according to claim 9 wherein the ester comonomer is isobutyl acrylate.

* * * * *